Sept. 6, 1966     P. E. STRIFLER     3,271,047

AXLE SUSPENSION

Filed June 15, 1964

INVENTOR

PAUL E. STRIFLER

BY Dicke & Craig

ATTORNEYS

_3,271,047_
AXLE SUSPENSION
Paul E. Strifler, Dettingen, Teck, Germany, assignor to Daimler-Benz Aktiengesellschaft, Stuttgart-Untertürkheim, Germany
Filed June 15, 1964, Ser. No. 375,203
7 Claims. (Cl. 280—124)

The present invention relates to an axle suspension for road vehicles and especially for the rear rigid axles of motor vehicles, wherein the axle is connected to the spring-cushioned upper structure of the vehicle by means of at least one pair of opposite guide arms which are obliquely inclined to each other, and preferably act in combination with additional guide arms which extend longitudinally of the vehicle and together with the first-mentioned guide arms form a link quadrangle, as seen in a side view of the vehicle.

In view of the increasing demand for a soft spring suspension of the wheels, especially by means of frictionless coil springs, pneumatic springs or the like, it becomes increasingly difficult to provide an automobile with a high side-tilt stability. This also applies to the rear axle of the vehicle, especially if the front wheels are individually suspended on substantially parallel guiding transverse arms or similar guide means and a relatively low instantaneous center is thereby produced on the front axle.

It is therefore the principal object of the present invention to improve the road-holding properties of a motor vehicle by providing an axle suspension which is adapted to attain an instantaneous center especially for the rear axle at the highest possible location.

A further object of the invention is to improve the road-holding properties of a motor vehicle also in other respects, especially as regards the support of the upper structure of the vehicle relative to the rear axle in the transverse direction of the vehicle and also as regards the pitch stability of the vehicle.

An important feature of the present invention consists in mounting the opposite guide arms, preferably of an upper pair, which are adapted to swing in an oblique direction relative to the longitudinal direction of the vehicle, so as to extend at such an oblique angle to a horizontal plane that their longitudinal axes which connect the joints of each of the two arms with each other intersect at a point which, as seen in the longitudinal direction of the vehicle, is located above the rear axle near a perpendicular transverse plane of the vehicle extending through the wheel centers and lies substantially at the level of the center of gravity of the upper structure of the vehicle or within or near a straight line which extends through the instantaneous center which is determined by the other wheel axle and through the center of gravity of the spring-cushioned upper structure of the vehicle. Since the point of intersection of the two longitudinal axes of the upper guide arms which are provided in the form of oblique arms determines the location of the instantaneous center of the upper vehicle structure relative to the axle which is connected by these guide arms to the upper structure, i.e. the body or the frame of the vehicle, any forces acting within the center of gravity, for example, while the vehicle is driven through a curve, cannot exert any torque upon the upper structure relative to the rear axle and therefore cannot cause any tilting of the upper structure of the vehicle.

Furthermore, any forces which act simultaneously herewith upon the upper structure transversely to the direction in which the vehicle is driven are taken up very effectively by the oblique guide arms between the upper structure and the rear axle. Since the other guide arms, preferably the lower ones, extend in the longitudinal direction of the vehicle, and since by the provision of rubber cushions in the joints they are able to evade the oblique arms by moving laterally, they will not interfere with the guiding function of the upper arms.

Another important feature of the invention consists in mounting the guide arms in such a manner that, as seen in a side view of the vehicle, the longitudinal axis of a lower guide arm is slightly upwardly inclined from the rear axle unit, while the longitudinal axis of the upper guide arms extends at a steep angle downwardly and forwardly from the rear axle unit so that both longitudinal axes intersect at a point in front of the rear axle and above the wheel center. This permits the point of intersection of the two longitudinal axes of the guide arms to be placed in such a position that not only a resultant brake pressure occurring at the point of engagement between the wheels and the road surface but also a resultant driving force acting upon the wheel axle exert a torque with reference to the mentioned point of intersection so that under the action of these forces the upper structure of the vehicle will move more closely toward the rear axle and thereby counteract the tendency of the vehicle to pitch when the brakes are applied or when the vehicle is quickly started.

The features and advantages of the present invention will become more clearly apparent from the following detailed description thereof which is to be read with reference to the accompanying diagrammatic drawings, in which:

FIGURE 2 shows a top view thereof; while

Figure 1:
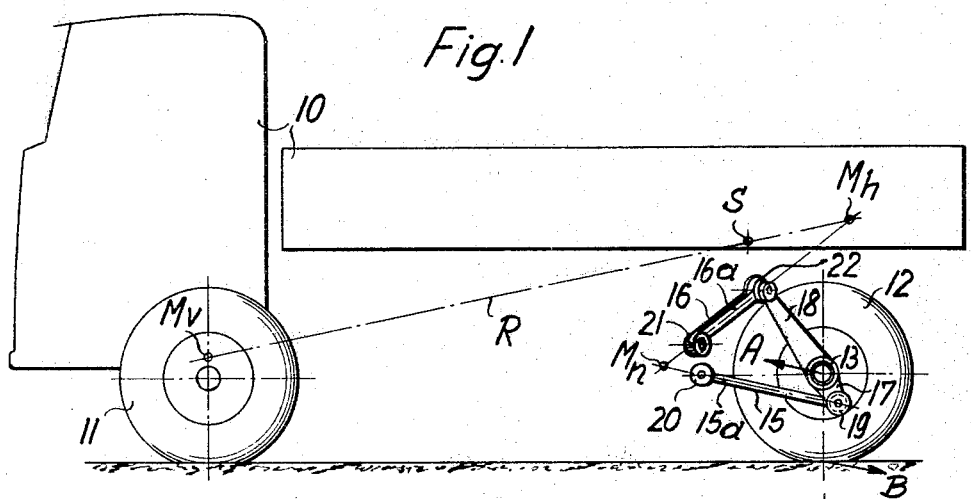
FIGURE 1 shows a side view of a motor vehicle with a rear axle which is suspended according to the invention.
Figure 2:
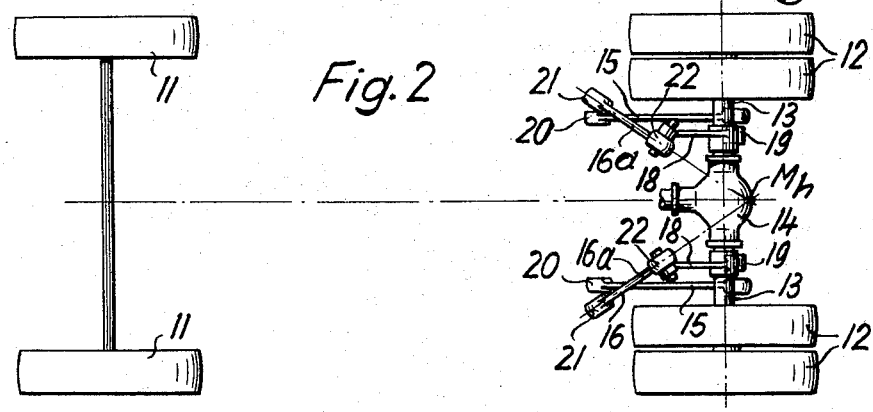
Figure 3:
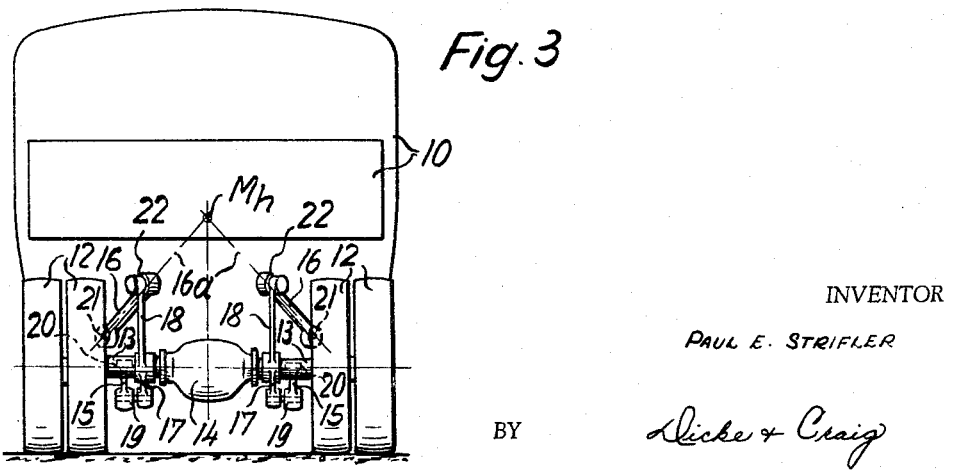
FIGURE 3 shows a rear view of the rear axle.

As illustrated in the drawings, the motor vehicle which is shown in the form of a truck with an upper structure or body 10 is provided in the usual manner with front wheels 11 which are controlled by a steering mechanism, not shown, and with driven rear wheels 12. The front wheels may be suspended on the vehicle body in any desired manner and support the same by springs and they may either be mounted on a rigid axle or be individually suspended, for example, by being connected to the upper structure of the vehicle by means of upper and lower transverse guide arms. In the drawings it is assumed that the truck has a wheel suspension which determines an instantaneous center $M_v$ for guiding the upper structure of the vehicle transversely with respect to the front axle. This instantaneous center $M_v$ lies at a slightly higher level than the wheel centers but it may also be located at a lower or still higher point. For the resilient suspension of the front wheels it is possible to employ leaf springs, coil springs, pneumatic springs, or the like.

The rear wheels, in the present case shown as dual wheels 12, are mounted on a rigid rear axle assembly 13 which includes the drive gear 14 and is connected to the upper structure of vehicle on each side thereof by a lower guide arm 15 and an upper guide arm 16 which are pivotably connected at their rear ends to the arms 17 and 18 which are rigidly secured to the rear axle, while their front ends are pivotably connected in front of the rear axle, for example, to bearing blocks (not shown) on the frame or body of the vehicle.

As illustrated in the drawings, the lower guide arms 15 are disposed within vertical longitudinal planes of the vehicle and the axes of their joints 19 and 20 extend at right angles to the direction in which the vehicle is driven. The axes 15a of the guide arms 15 extend upwardly at an oblique angle in the forward direction.

The upper guide arms 16 form oblique arms insofar as their longitudinal axes 16a which connect the axes of the joints 21 and 22 extend upwardly toward the rear at a steeply oblique angle, as seen in a side view of the vehicle, and also obliquely toward the central vertical longitudinal plane of the vehicle or toward the opposite side of the latter, as seen in a plan view upon the vehicle. The axes of the joints 21 and 22 are then disposed so that when the rear axle swings upwardly and downwardly, the guide arms 16 carry out a movement one component of which extends in a direction within a vertical transverse plane, while another component extends within a vertical longitudinal plane.

In order to balance the differences in the movements of the different guide arms which occur during the resilient up and down movements of the rear axle, the joints are universally movable either entirely or to a limited extent, for example, by the employment of rubber bushings or other suitable rubber elements in the joints.

Although for resiliently suspending the rear axle, any suitable springs may again be provided similarly as on the front axle, it is of special importance in connection with the axle suspension according to the invention if a soft spring suspension, especially in the form of rubber springs, be provided which by itself is not able to take up transverse forces or only to an insignificant extent.

The instantaneous center $M_h$ upon which the transverse support or lateral stability of the spring-supported upper structure of the vehicle relative to the rear axle depends is attained by the point of intersection of the longitudinal axes 16a of the guide arms 16 of both sides of the vehicle. When the vehicle is not in operation, this instantaneous center $M_h$ is located within the central vertical longitudinal plane of the vehicle and when the upper structure of the vehicle leans toward one side when the vehicle is driven through a curve, the location of this instantaneous center $M_h$ is shifted more or less toward the right or left. According to a very preferred embodiment of the invention, the guide arms 16 are inclined at such an angle that the instantaneous center $M_h$ lies on a straight line R which connects the forward instantaneous center $M_v$ with the center of gravity S of the upper vehicle structure or that the center of gravity S lies on the straight line R, the so-called rolling axis, which connects the forward instantaneous center $M_v$ with the rear center $M_h$. The upper vehicle structure is therefore fully prevented from tilting toward the side when the vehicle is driven along a curve.

The center of gravity S of the vehicle body does not have to be located exactly on the rolling axis R, but it may also lie slightly above or below the same. This will however, result in a corresponding side tilt of the vehicle body either toward the inside or outside of the curve along which the vehicle is driven.

The instantaneous center $M_n$ of the longitudinal support of the rear axle which determines the pitching angle of the vehicle is formed by the point of intersection of the two longitudinal axes 15a and 15b of the guide arms 15 and 16, as seen in a side view of the vehicle according to FIGURE 1. Since when the brakes of the vehicle are applied, a resultant brake pressure B occurs at the points of engagement of the wheels with the road in an obliquely downward direction toward the rear, while at a quick start of the vehicle a resultant starting force A occurs on the rear axle 13 in an obliquely upward direction toward the front, a torque is produced in both cases relative to the instantaneous center $M_n$ which tends to move the rear axle toward the vehicle body or, vice versa, the latter toward the rear axle, and which thereby counteracts the pitching inclination of the vehicle at which the upper vehicle structure tends to go down in front and to lift up at the rear.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An axle suspension for a road vehicle having at least two axles and wheels thereon, and an upper vehicle structure resiliently supported on said axle, one of said axles being a rigid rear axle having an upwardly extending axle arm rigidly secured to each side thereof, a pair of upper guide arms pivotally connected at one end to said axle arm and at the other end to said upper structure and extending from said axle arm at an oblique direction to the longitudinal direction of the vehicle and away from each other and adapted to swing in said oblique direction and also extending at an oblique angle to the horizontal plane so that the longitudinal axes of said upper guide arms, as seen in a side view of the vehicle, intersect at a point located above said axle near a perpendicular transverse plane of the vehicle extending from the centers of the wheels on said axle, said point being located near the level of the center of gravity of said upper structure, a pair of downwardly extending axle arms rigidly secured to said axle at the opposite sides thereof, a pair of lower guide arms pivotally connected at one end to said last axle arms and extending therefrom at a small angle upwardly and pivotally connected at the other end to said upper structure, said longitudinal axis of each of said upper guide arms extending steeply downwardly and forwardly from their respective axle arms, the longitudinal axes of said upper and lower guide arms on each side of said axle intersecting at a point located in front of said axle and above the center of the wheel thereon.

2. An axle suspension as defined in claim 1, in which said pair of lower guide arms extends substantially in the longitudinal direction of said vehicle, the pivot axes of each of said lower arms extending substantially transversely to said vehicle, said pair of upper guide arms extending obliquely to the longitudinal direction of said vehicle and the pivot axes thereof extending obliquely to the longitudinal and transverse directions of said vehicle.

3. An axle suspension as defined in claim 1, in which at least one of the pivot joints of each of said guide arms is resiliently connected to at least one of the two parts comprising said upper structure and said axle.

4. An axle suspension as defined in claim 1, in which said longitudinal axes of said upper guide arms, as seen in a plan view, converge toward the rear and intersect with each other at a point coinciding with said point of intersection of said longitudinal axes, as seen in a side elevation view of the vehicle.

5. An axle suspension as defined in claim 1, wherein, said first mentioned point of intersection for said upper guide arms is located above the center of gravity of said vehicle upper structure.

6. An axle suspension for a road vehicle having at least two axles and wheels thereon, and an upper vehicle structure resiliently supported on said axles, one of said axles being a rigid rear axle having an upwardly extending axle arm rigidly secured to each side thereof, a pair of upper guide arms pivotally connected at one end to said axle arms and at the other end to said upper structure and extending from said axle arms at an oblique direction to the longitudinal direction of the vehicle and away from each other and adapted to swing in said oblique direction and also extending at an oblique angle to a horizontal plane so that the longitudinal axes of said upper guide arms, as seen in a side view of the vehicle, intersect at a point located above said axle closely adjacent to a straight line extending through the instantaneous center determined by the other wheel axle and through the center of gravity of said upper structure, a pair of downwardly extending axle arms rigidly secured to said axle at the opposite sides thereof, a pair of lower guide arms pivotally connected at one end to said last axle arms and extending therefrom at a small angle upwardly and pivotably connected at the other end to said upper structure, said longitudinal axis of each of said upper guide arms extending steeply downwardly and forwardly from their respective axle arms, the longitudinal axes of said upper and lower guide arms on each side of said axle intersecting at a point located in front of said axle and above the center of the wheel thereon.

7. An axle suspension as defined in claim 6, in which said first mentioned point of intersection for said upper guide arm is located above said one axle near a perpendicular transverse plane of the vehicle extending from the centers of the wheels on said one axle and above the center of gravity of said upper structure.

References Cited by the Examiner

UNITED STATES PATENTS

| | | | |
|---|---|---|---|
| 2,162,320 | 6/1939 | Siebler | 280—112 X |
| 2,300,844 | 11/1942 | Olley | 180—73 |
| 2,323,007 | 6/1943 | Borgward | 267—20 X |
| 2,746,766 | 5/1956 | Nallinger | 180—73 X |
| 2,919,760 | 1/1960 | Fehlberg | 180—73 |
| 2,998,265 | 8/1961 | Kozicki | 180—73 X |
| 3,174,771 | 3/1965 | Muller | 180—73 X |

BENJAMIN HERSH, *Primary Examiner.*

W. A. MARCONTELL, M. S. SALES,
*Assistant Examiners.*